US012641513B1

(12) United States Patent
    Thommana et al.

(10) Patent No.:  US 12,641,513 B1
(45) Date of Patent:     May 26, 2026

(54) IMPACT OF HF COUPLER ON HF MESH NETWORKING

(71) Applicant: Rockwell Collins, Inc., Cedar Rapids, IA (US)

(72) Inventors: John V. Thommana, Cedar Rapids, IA (US); Joseph Splean, II, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 385 days.

(21) Appl. No.: 18/238,814

(22) Filed: Aug. 28, 2023

(51) Int. Cl.
    *H04W 40/12*       (2009.01)
    *H04W 24/08*       (2009.01)
    *H04W 40/24*       (2009.01)
(52) U.S. Cl.
    CPC ........... *H04W 40/12* (2013.01); *H04W 24/08* (2013.01); *H04W 40/246* (2013.01)
(58) Field of Classification Search
    CPC .... H04W 40/12; H04W 24/08; H04W 40/246
    See application file for complete search history.

(56) References Cited

U.S. PATENT DOCUMENTS

| | | | |
|---|---|---|---|
| 9,210,067 B1 | 12/2015 | Agarwal | |
| 2003/0086425 A1 | 5/2003 | Bearden et al. | |

| | | | |
|---|---|---|---|
| 2006/0245424 A1 | 11/2006 | Ramanathan et al. | |
| 2008/0129610 A1 * | 6/2008 | Tsfati ..................... | H03D 3/007 |
| | | | 343/702 |
| 2011/0170859 A1 * | 7/2011 | Conklin .................. | H04L 45/70 |
| | | | 398/25 |
| 2016/0135111 A1 | 5/2016 | Huang et al. | |
| 2018/0351857 A1 | 12/2018 | Vairavakkalai et al. | |
| 2019/0150001 A1 | 5/2019 | Jen et al. | |
| 2022/0131601 A1 * | 4/2022 | Mayer ..................... | H04L 45/02 |
| 2025/0258211 A1 | 8/2025 | Burton et al. | |

FOREIGN PATENT DOCUMENTS

CN            110249634 A        9/2019

* cited by examiner

*Primary Examiner* — Tejis Daya
(74) *Attorney, Agent, or Firm* — Sulter Swantz IP

(57)                ABSTRACT

An HF mesh network connectivity algorithm incorporates the impact of coupler efficiency in the transmit direction and impact of impedance mismatch on the receive direction. Nodes in the HF mesh network include an HF coupler; the HF coupler switches between an impedance matching path and a bypass path. The impedance matching path may be used to transmit while the bypass path is used to receive over a wider spectrum then is enabled with impedance matching. The impedance matching path may be utilized for certain narrow bandwidth receive operations. The bypass path enables a spectral sensor to see all propagating frequencies.

20 Claims, 10 Drawing Sheets

CONNECTIVITY WITH ANTENNA
IMPEDANCE MISMATCH LOSS

CONNECTIVITY WITH ANTENNA
IMPEDANCE MISMATCH LOSS

CONNECTIVITY WITHOUT ANTENNA
IMPEDANCE MISMATCH LOSS

| LINK | PROPAGATING FREQUENCY (MHz) WITH MISMATCH LOSSES |
|---|---|
| NS1_NS2 | (6, 18.5), (7, 19.74), (8, 19.5), (10, 0.5) |
| NS2_NS1 | (4, 9.6), (6, 25.6), (7, 22.6), (8, 19.6) |

FIG.6A

| LINK | PROPAGATING FREQUENCY (MHz) WITH MISMATCH LOSSES |
|---|---|
| NS1_NS2 | (NS2, 6, 18.5), (NS2, 7, 19.74), (NS2, 8, 19.5), (NS2, 10, 0.5 ), (NA3, 12, 2.6), (NHS, 6, 2.2), (NA4, 12, 3.2) |
| NS2_NS1 | (NSl, 4, 9.6), (NSl, 6, 25.6), (NSl, 7, 22.6), (NSl, 8, 19.6) |
| NS1-NA3 | (NS2, 6, 18.5), (NS2, 7, 19.74), (NS2, 8, 19.5), (NA3, 12, 2.6), (NS2, 10, 0.5) |
| NA3-NS1 | (NS2, 12, 6.3) |

START (COMPUTE EIRP)

EXTRACT Tx POWER (WATTS), COUPLER EFFICIENCY,
Tx ANTENNA GAIN (dBi) —708

EFFECTIVE Tx POWER = Tx POWER* COUPLER EFFICIENCY —710

EFFECTIVE Tx POWER dBm =
10* LOG10 Effective Tx ANTENNA GAIN —712

EIRP = EFFECTIVE Tx POWER dBm + Tx ANTENNA GAIN —714

START (COMPUTE EIRP)

700

START (COMPUTE VOACAP PATH LOSS)

EXTRACT Tx (LAT, LONG), Rx (LAT, LONG), FREQUENCY, HOUR, DAY, MONTH, SSN — 716

SET REQUIRED RELIABILITY = 90% — 718

RUN VOACAP DISTANCE LOSS PROFILE — 720

EXTRACT PATH LOSS (dB) — 722

START (COMPUTE VOACAP PATH LOSS)

702

START (COMPUTE Rx SIGNAL STRENGTH)

EXTRACT EIRP, PATH LOSS, PATH LOSS MARGIN, FREQUENCY, Rx ANTENNA GAIN, Rx MISMATCH LOSS —724

Rx SIGNAL = EIRP - PATH LOSS - PATH LOSS MARGIN + Rx ANTENNA GAIN - Rx MISMATCH LOSS —726

START (COMPUTE VOACAP PATH LOSS)

IMPACT OF HF COUPLER ON HF MESH NETWORKING

BACKGROUND

High frequency (HF) operations require large antennas. For example, at three megahertz, a system would require a minimum thirty-foot antenna. A typical broadband antenna for large fixed-site stations may by 110 ft (34 m) and constrain impedance mismatch loss to 2:1 (the impedance mismatch loss across the HF frequency band, two to thirty MHz, is less than 0.5 dB even with no antenna coupler). The spectrum sensor/HF Receiver connected to such a broadband antenna only suffers a 0.5 dB penalty.

Such antennas are too large for mobile platforms. Mobile platforms utilize electrically short antennas with high variable impedance across the HF band. In order to efficiently couple the transmitted power from the power amplifier to the antenna, an impedance matching device known as an HF coupler is used. The HF coupler limits impedance mismatch loss to less than 0.17 dB, but the HF coupler narrows the operating frequency range; the tuning bandwidth is frequency dependent; and the HF coupler is only 70% efficient (i.e., it burns 30% of the power exchanged internal to the coupler in the form of heat).

To implement an ad-hoc HF mesh network, each HF node must have a spectral sensor. The spectrum sensor must be able to access the entire HF spectrum to detect all propagating frequencies from all participants in the network, but the HF coupler limits the spectral view of the sensor. In an HF mesh network with mobile nodes using an HF coupler, the coupler bandwidth is around 3 kHz at 2 MHz and bandwidths of 48 KHz can only be supported for frequencies above 11 MHz. The maximum coupler bandwidth supportable at 30 MHz is less than 100 KHz. Certain network requirements can only be satisfied via a hub and spoke network with fixed site nodes being the central hubs with spectral sensors. The HF coupler at all disadvantaged nodes limits the view of the spectral sensor to the coupler bandwidth at the tuned frequency. In contested theaters, such architecture is unsupportable.

It would be advantageous to have a system and method to enable HF mesh networks with mobile platforms and broad frequency capability without fixed stations.

SUMMARY

In one aspect, embodiments of the inventive concepts disclosed herein are directed to an HF mesh network connectivity algorithm that incorporates the impact of coupler efficiency in the transmit direction and impact of impedance mismatch on the receive direction. Nodes in the HF mesh network include an HF coupler; the HF coupler switches between an impedance matching path and a bypass path. The impedance matching path may be used to transmit while the bypass path is used to receive over a wider spectrum then is enabled with impedance matching.

Configuration files include antenna configuration and the coupler configuration files. A routing table may be configured to consider only bi-directional links for connectivity or use composite link margin to route using unidirectional paths if end-to-end connectivity can be found. The transmit and receive paths can be different and may use different frequencies.

In a further aspect, the impedance matching path may be utilized for certain narrow bandwidth receive operations.

In a further aspect, the bypass path enables a spectral sensor to see all propagating frequencies.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 6A shows a routing table according to an exemplary embodiment;

FIG. 6B shows a routing table according to an exemplary embodiment;

DETAILED DESCRIPTION

Figures 1A, 1B:
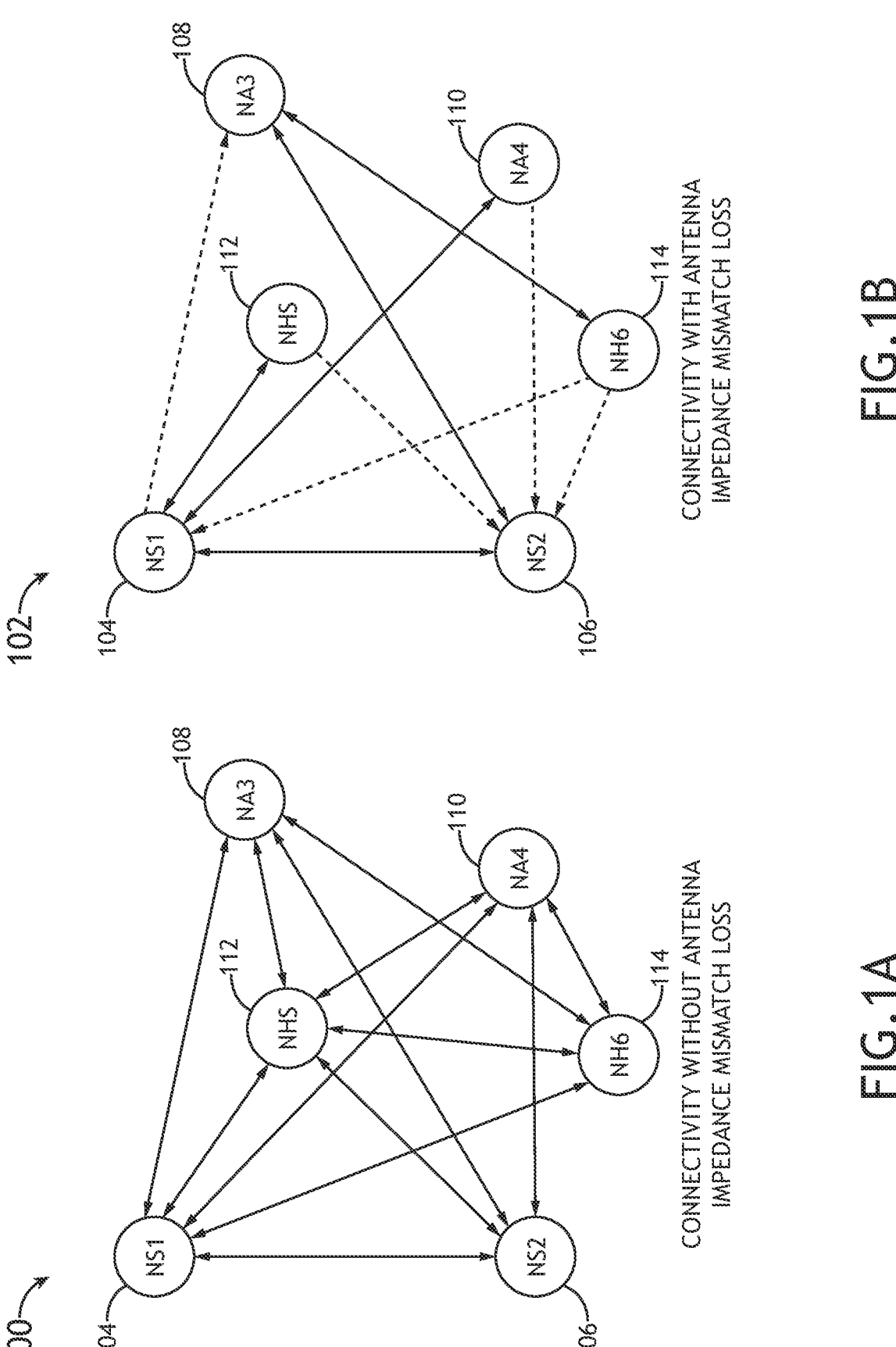
FIG. 1A shows a block diagram of a mesh network according to an exemplary embodiment.
FIG. 1B shows a block diagram of a mesh network according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed an HF mesh network connectivity algorithm that incorporates the impact of coupler efficiency in the transmit direction and impact of impedance mismatch on the receive direction. Nodes in the HF mesh network include an HF coupler; the HF coupler switches between an impedance matching path and a bypass path. The impedance matching path may be used to transmit while the bypass path is used to receive over a wider spectrum then is enabled with impedance matching. The impedance matching path may be utilized for certain narrow bandwidth receive operations. The bypass path enables a spectral sensor to see all propagating frequencies.

Many platforms have only a single electrically short HF antenna. It is practically difficult for these platforms to receive HF communications while transmitting without additional equipment to support simultaneous operations. Fixed site nodes use split-site architecture where the transmitter and receiver are separated by tens of miles to prevent the transmitter from blinding the receiver so that full duplex communication is possible. Because of power limitations, the HF coupler cannot be bypassed during transmission.

Referring to FIGS. 1A-1B, block diagrams of a mesh network 100, 102 according to an exemplary embodiment are shown. Where an HF coupler with an impedance matching element is used (as illustrated in FIG. 1A), nodes 104, 106, 108, 110, 112, 114 may have sufficient bandwidth/ signal strength for bidirectional communication. However, with impedance mismatch loss (as illustrated in FIG. 1B), some excluded nodes 114 may be effectively removed from the mesh network 100, 102, as even though certain nodes 104, 106 can receive transmissions from the excluded node 114, there are no nodes 104, 106, 108, 110, 112 that send transmissions to the excluded node 114. Furthermore, isolated nodes 108 cannot directly communicate with certain neighboring nodes 104, 112, but can communicate with them using multi-hop relaying.

Every node 104, 106, 108, 110, 112, 114 may be associated with one or more antenna configuration files. A node 104, 106, 108, 110, 112, 114 can be associated with multiple antenna configuration files because some platforms may have multiple HF antennas and the appropriate antenna configuration file may be selected for a given mission. In at least one embodiment, an antenna configuration may be defined by the frequency, gain, and mismatch loss in dB. Antenna gain values may be averaged values that may have +/−5 dB variation due to angular variation in the antenna pattern. Antenna gain varies depending on the direction of the destination node, launch angle, frequency, etc. In at least one embodiment, antenna gain configuration may be dependent on azimuth or elevation angles and frequency. A gain table may have multiple frequency and angle pairs to obtain a better antenna gain. Because communication often relies on different elevation angles between nodes, it may be impossible to find a single frequency where all nodes will be able to communicate. It is desirable for nodes to be able to hear on all frequencies.

Figure 2:
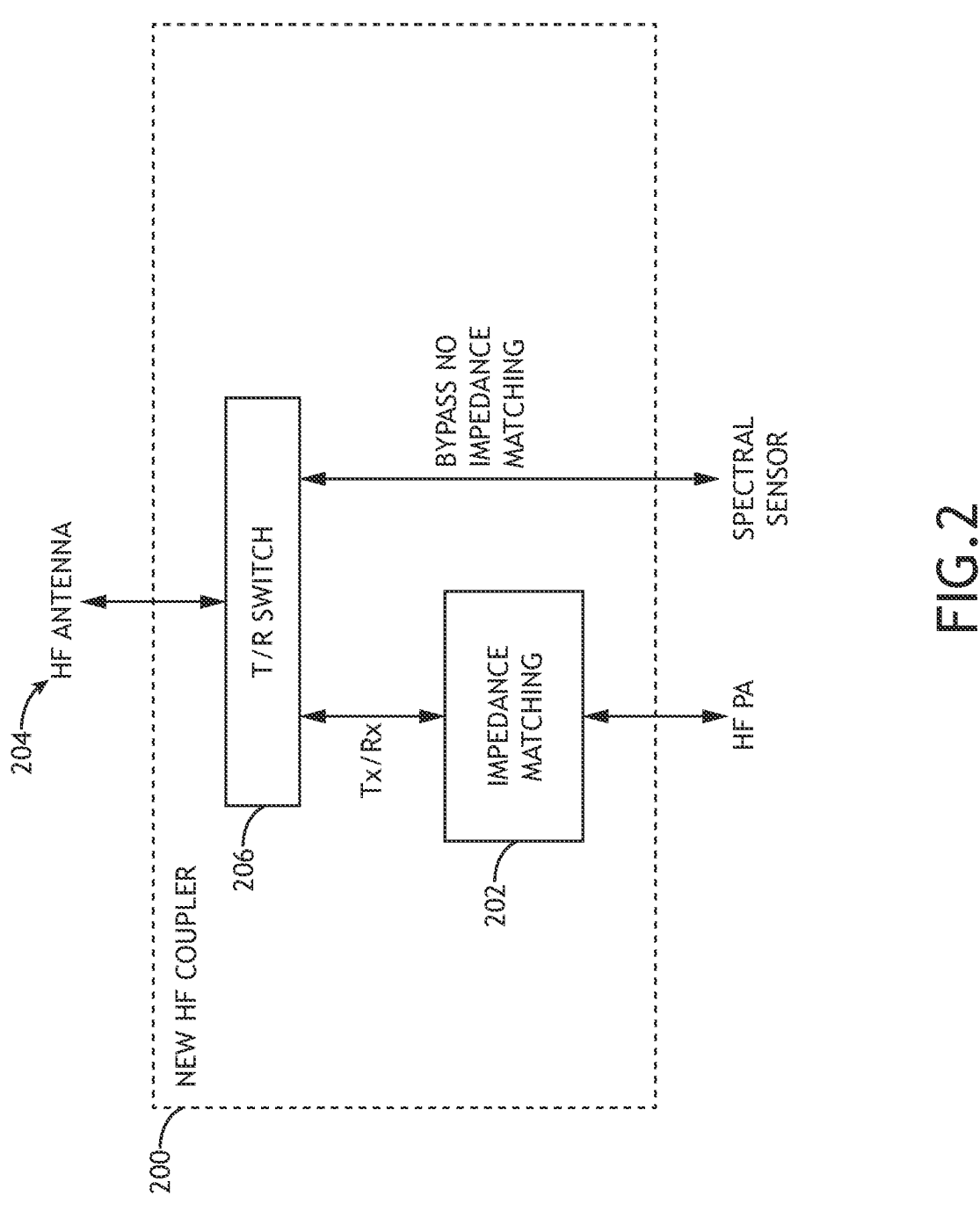
FIG. 2 shows a block diagram of an HF coupler suitable for implementing exemplary embodiments.

Referring to FIG. 2, a block diagram of an HF coupler 200 suitable for implementing exemplary embodiments is shown. The HF coupler 200 defines a transmit path with a high-performance exciter according to transmit specifications of legacy 3 kHz radios, and also includes a 48 KHz wideband transmit path. The HF coupler 200 also defines a receive path that may accept impedance matched coupler input from an impedance matching element 202 or direct input from an antenna 204.

Where a wideband receiver receives an impedance matched input, the wideband receiver can only see the coupler bandwidth. If the impedance matching element 202 is bypassed, then the wideband receiver can see the entire frequency range (e.g., 2 MHz to 30 MHz). The impedance matching element 202 may be bypassed via a switch 206 that may generally function as a transmit/receive switch, but that in certain situations it may be advantageous not to bypass the impedance matching element 202 in a receive mode.

Propagation tools may ignore the impact of the HF coupler 200 during transmission. Mismatch loss is on the order of 0.2 dB. Furthermore, HF couplers have efficiencies that range between 70% and 90% depending on frequency and power handling capacity. In contested environments, a potential 20+% power loss has to be accounted for during transmission, to ensure that jamming threats can be overcome.

It may also be advantageous to consider impedance mismatch loss during receive. Such impedance mismatch loss becomes important in both contested and uncontested environments. Frequency dependent mismatch loss variations can be very large and cannot be ignored when the HF coupler 200 is bypassed during receive. Such loss is an unavoidable result of allowing a spectral sensor 208 to see outside the HF coupler bandwidth. Impedance mismatch losses can alter the frequencies that propagate between nodes and also introduce unidirectional connectivity.

HF coupler efficiency is dependent on the frequency of operation and power handling capacity of the HF coupler 200. Frequency dependent HF coupler efficiency may enable a more accurate determination of the power transferred from a power amplifier to the antenna 204 during transmit as compared to a average 70% value used in simulations.

Antenna configuration parameters determine whether an average coupler efficiency or frequency dependent coupler efficiency is used.

Figure 3:
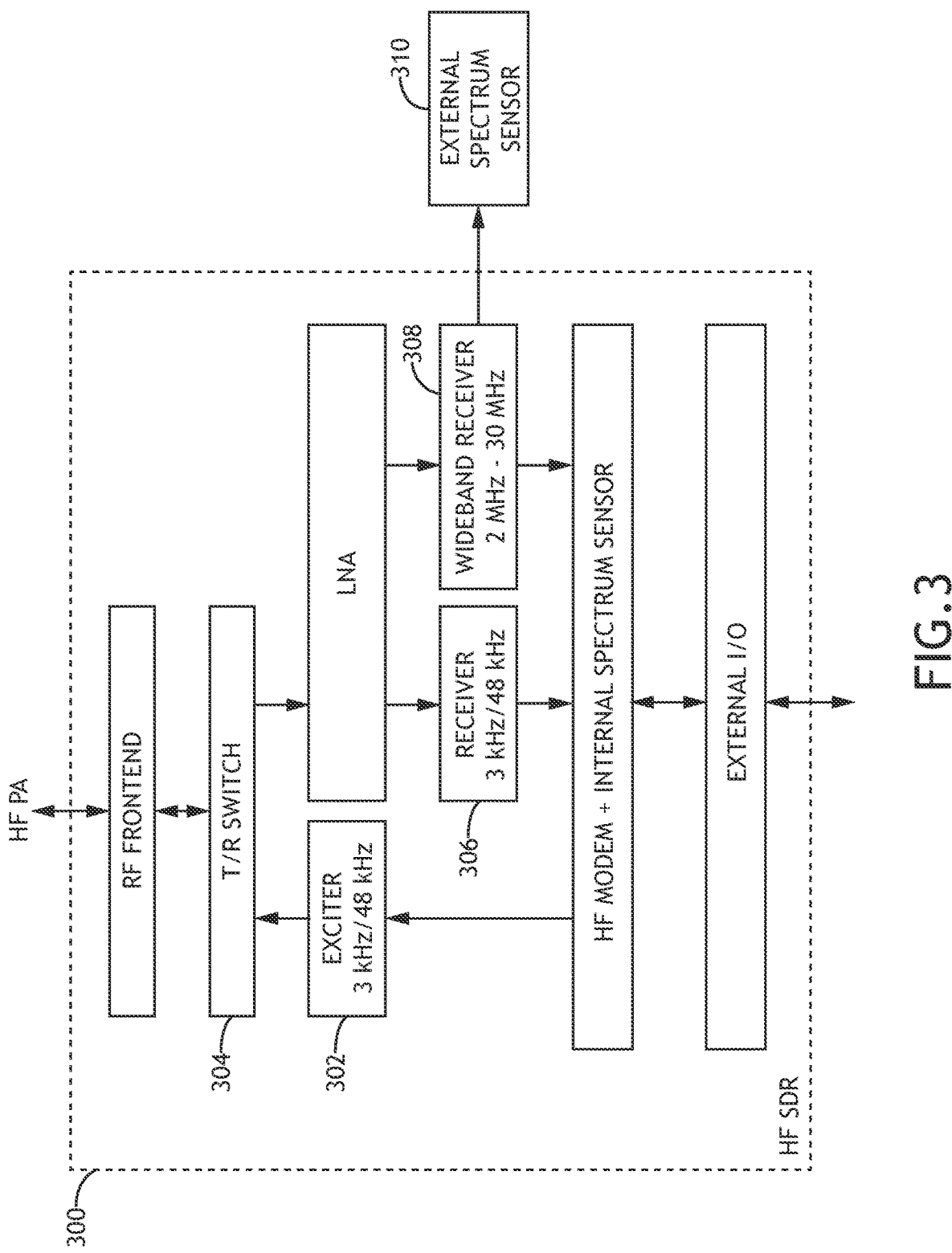
FIG. 3 shows a block diagram of an HF software defined radio suitable for implementing exemplary embodiments.

Referring to FIG. 3, a block diagram of an HF software defined radio 300 suitable for implementing exemplary embodiments is shown. The HF software defined radio 300 defines a transmit path including a high-performance exciter 302 according to transmit specifications of legacy 3-kHz radios, and also includes a 48-kHz wideband transmit path. The HF software defined radio 300 also defines a receive path (the paths accessible via a switch 304) that may accept impedance matched coupler input or the direct antenna input.

In at least one embodiment, the receive path may include a receiver 306 configured for a relatively narrow bandwidth (e.g., 3 kHz to 48 KHz) to receive signals when an HF coupler is used in the receive path, and a receiver 308 configured for a relatively wide bandwidth (e.g., 2 MHz to 30 MHz) to receive signals when the HF coupler is bypassed. In at least one embodiment, the wide bandwidth receiver 308 may be in data communication with an external spectrum sensor 310.

Ad-hoc mesh network waveforms may be capable of interfacing with spectrum sensors 310, either integrated into the HF software defined radio 300 or external. The waveform supports both active node discovery using channel sounding and/or passive node discovery using the spectrum sensor 310 in conjunction with integrated Voice of America Coverage Analysis Program (VOACAP). Route management functionality may consider the impact of HF coupler efficiency during transmission and also accounts for antenna gain in the direction of the HF receiver nodes.

Figure 4:
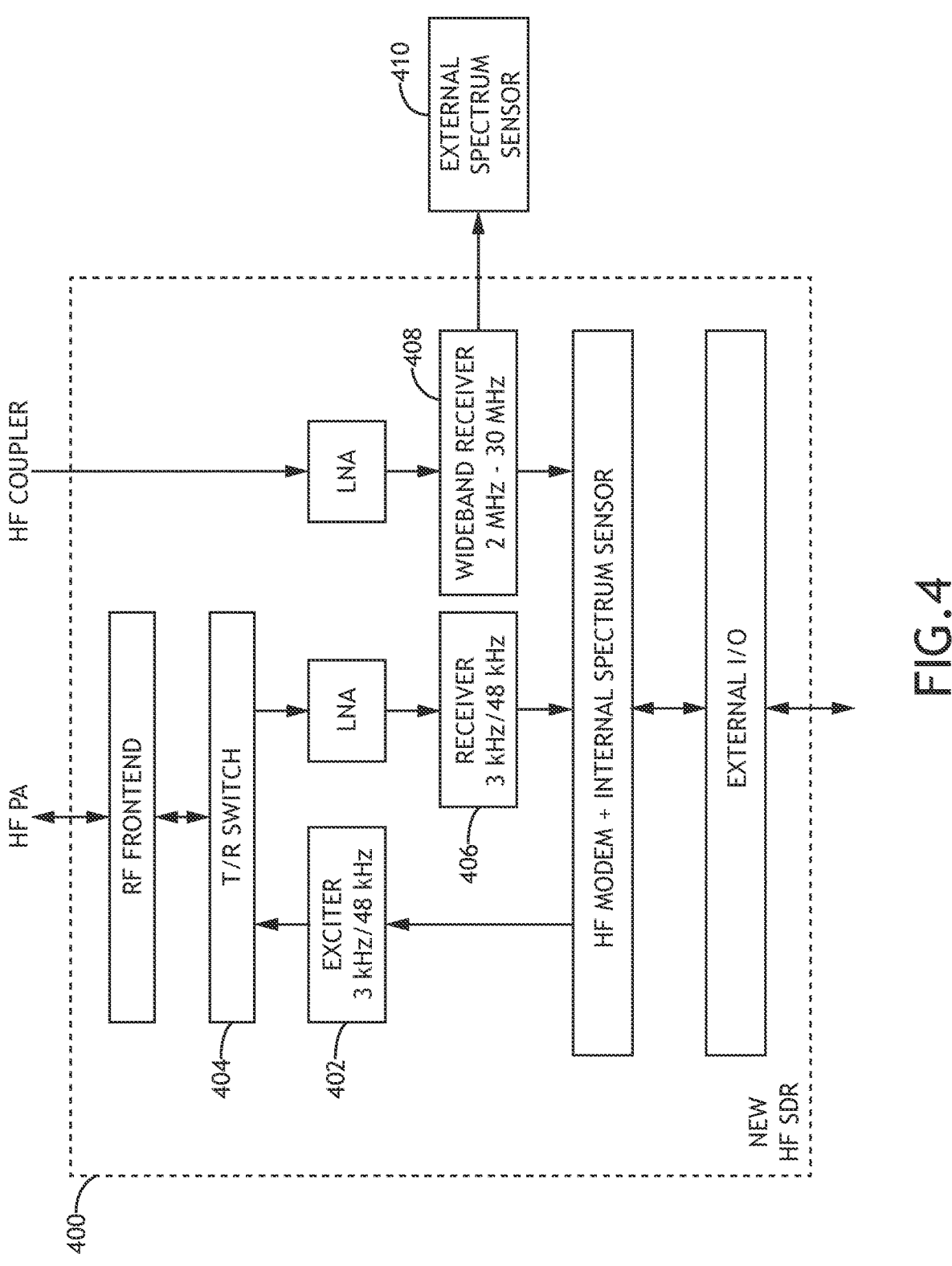
FIG. 4 shows a block diagram of an HF software defined radio suitable for implementing exemplary embodiments.

Referring to FIG. 4, a block diagram of an HF software defined radio 400 suitable for implementing exemplary embodiments is shown. The HF software defined radio 400 defines an impedance match path including a switch 404 connected to a high-performance exciter 402 to transmit and a relatively narrow bandwidth receiver 406. The impedance match path is connected to an impedance matching element of an HF coupler. Furthermore, the HF software defined radio 400 defines an impedance bypass path including a relatively wide bandwidth receiver 408. In at least one embodiment, the wide bandwidth receiver 408 may be in data communication with an external; spectrum sensor 410. Such embodiment enables simultaneous reception of an impedance matched and bypassed path so that the HF receiver 406 performance of 3 kHz and 48 KHz paths are not compromised.

Figure 5:
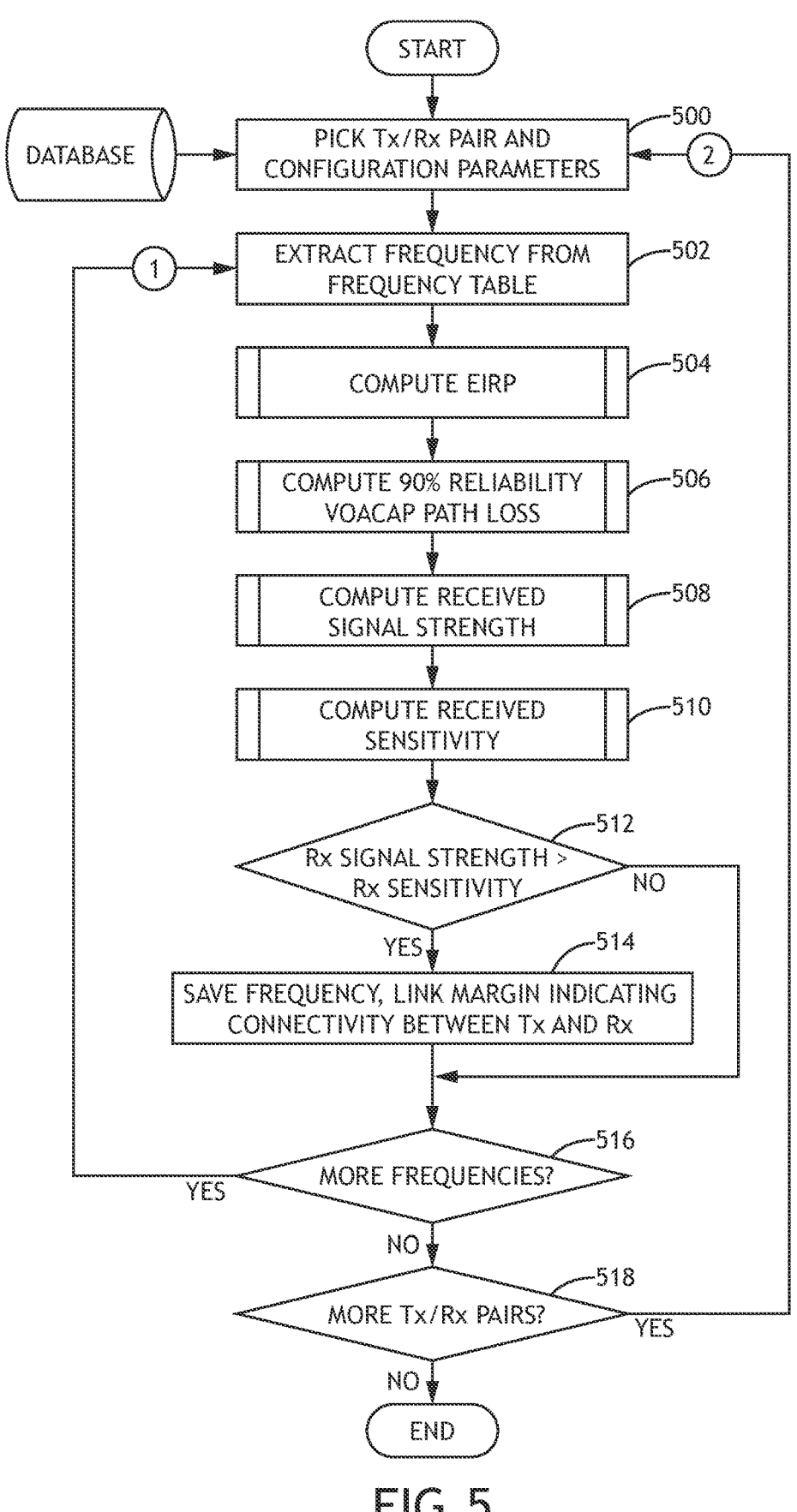
FIG. 5 shows a flowchart of a method for producing a routing table according to an exemplary embodiment.
Figure 7A:
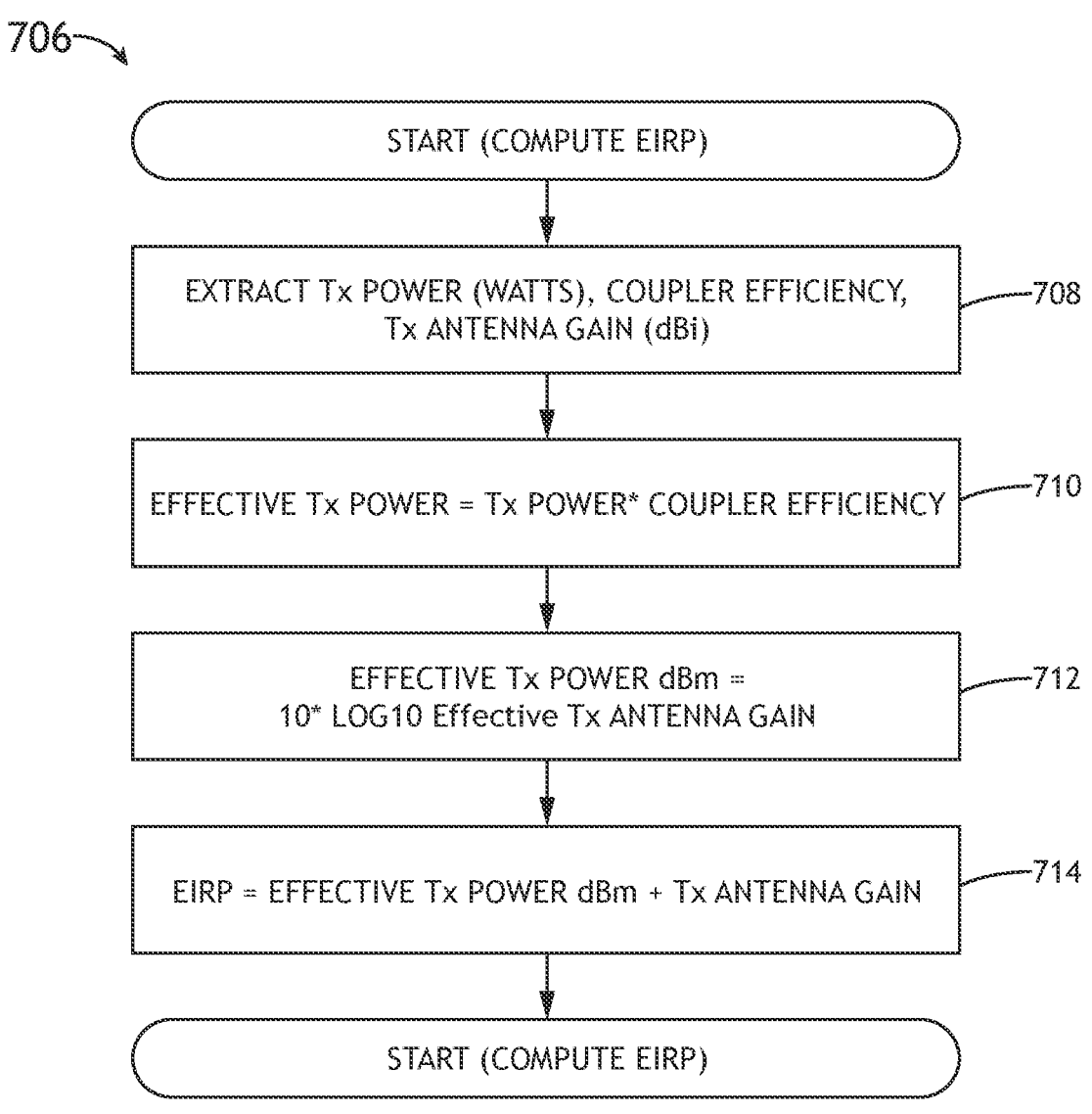
FIG. 7A shows a flowchart of a method according to an exemplary embodiment.
Figure 7B:
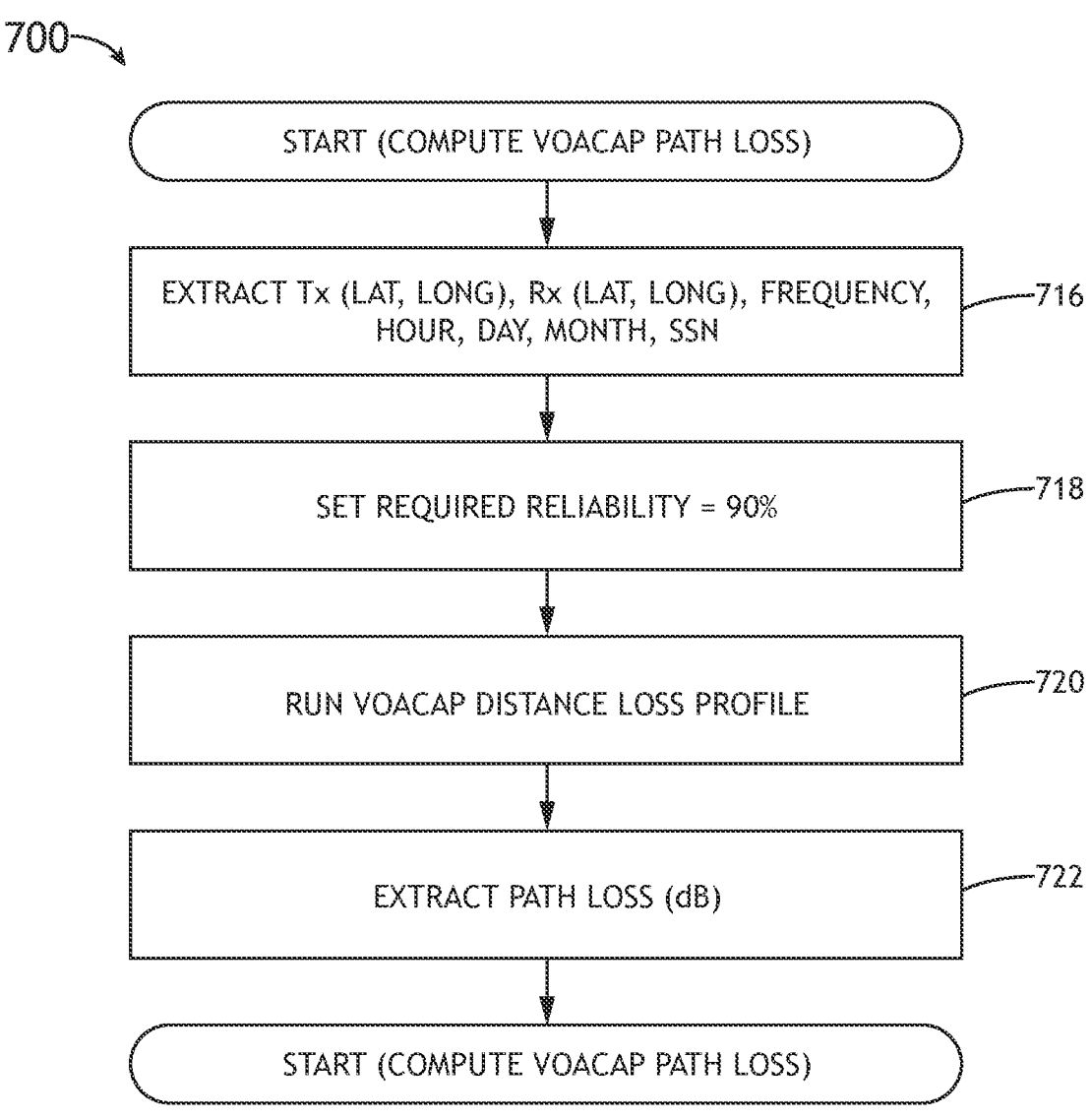
FIG. 7B shows a flowchart of a method according to an exemplary embodiment.
Figure 7C:
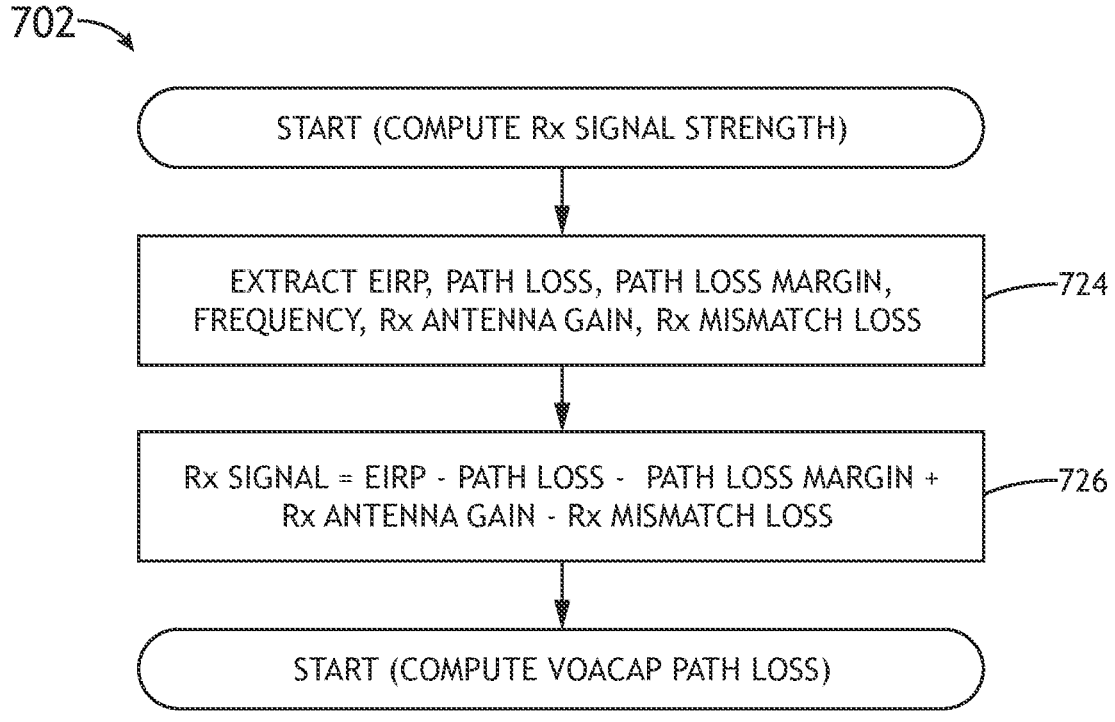
FIG. 7C shows a flowchart of a method according to an exemplary embodiment.
Figure 7D:
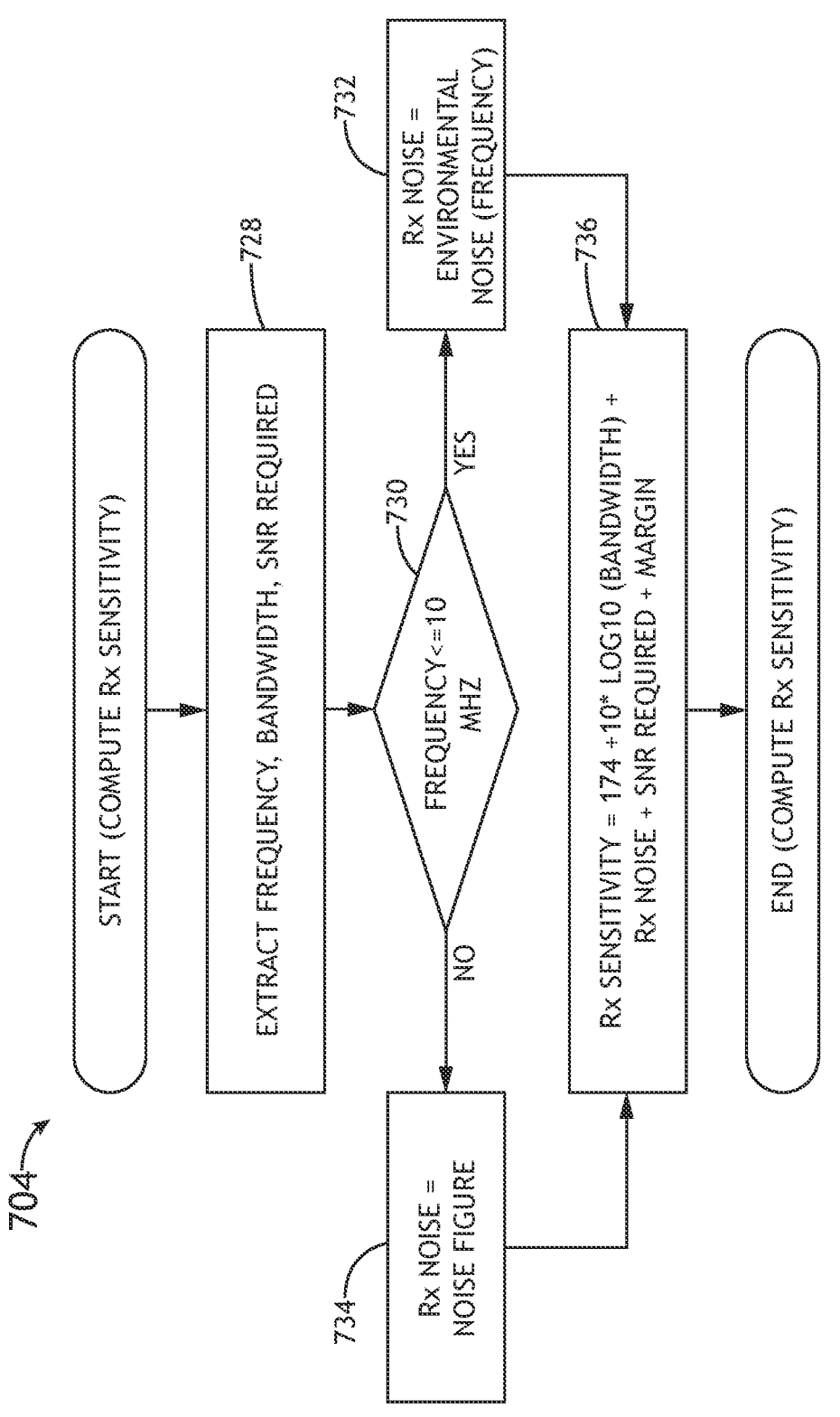
FIG. 7D shows a flowchart of a method according to an exemplary embodiment.

Referring to FIGS. 5-6B, a flowchart of a method for producing a routing table, and routing tables, according to exemplary embodiments are shown. Nodes in an HF mesh network determine ad-hoc mesh connectivity between all transmit/receive pairs, including HF coupler efficiency and the antenna mismatch losses due to bypassing the HF coupler during receive. Each node iteratively selects 500 transmit/receive pairs from a database of nodes in the HF mesh network, and iteratively selects 502 a frequency from frequency table. The node computes 504 effective radiated power (EIRP) for the transmit/receive pair and frequency, including coupler efficiency and antenna gain, and computes 506 a 90% reliability path loss between the transmitter and receiver using an HF propagation tool such as VOACAP. Based on the EIRP and reliability path loss, the node computes 508 a received signal strength and computes 510 a corresponding receive sensitivity. If the node determines 512 if the receive signal strength is greater than the receive sensitivity, the transmit/receive pair and frequency are stored in a routing table as a potential frequency; in at least one embodiment, an associated link margin may be recorded if available. The process is repeated as long as the node determines 516 there are more potential frequencies, or determines 518 there are more transmit/receive pairs.

In at least one embodiment, the method produces a routing table (as in FIG. 6A) having entries corresponding to a combination of frequency and link margin available for every transmit/receive pair. Such entries correspond to directly connected ("one-hop") nodes. It may be appreciated that entries are directional in nature.

Each node may then determine indirect routes to all nodes that can be reached (as in FIG. 6B). Entries may include intervening nodes. For example, a first entry 600 may include direct links from a first node to a second nodes and indirect links including intervening nodes; while a second entry 602 may include only indirect links from the second node to the first node.

The routing table may be created via predictive VOACAP connectivity, ad-hoc mesh connectivity determining techniques, ALE probes, or the like. If ad-hoc mesh connectivity techniques are used, then only direct connectivity for a node can be determined. In at least one embodiment, nodes may periodically exchange local routing tables to ensure that all nodes in the network can determine the connectivity to every other node in the network. Nodes may establish entries for indirect connection by combining local routing tables.

Unlike traditional routing tables, where connectivity between nodes implies bi-directional connectivity, in an HF mesh network the connectivity can be unidirectional due to antenna impedance mismatch which can be different in the receive direction as it is dependent on the antenna used on the platform. Entries in the routing table are therefore direction dependent.

In at least one embodiment, each routing table entry with more than one path may be ordered based on link margin for every transmit/receive pair. Where indirect paths exist, the node may determine composite end-to-end link margin.

Referring to FIG. 7A-7D, flowcharts of methods according to an exemplary embodiment are shown. During a routing table discovery/production process (as set forth in FIG. 5), nodes in an HF mesh network may compute 706 EIRP for each transmit/receive pair and frequency. To compute 706 EIRP, including HF coupler efficiency and mismatch loss due to bypass, the node may extract 708 transmit power, HF coupler efficiency, and transmit antenna gain. Effective transmit power is computed 710 as the product of transmit power and HF coupler efficiency. Then effective transmit beam power is computed 712, for example as the weighted log of the effective transmit power (e.g., 10*log effective transmit power*1000). The EIRP, including HF coupler efficiency, can then be computed 714 as the sum of the effective transmit beam power and transmit antenna gain.

In at least one embodiment, nodes in an HF mesh network may compute 700 a 90% reliability path loss between the transmitter and receiver using an HF propagation tool. To compute 700 reliability path loss, the node may extract 716 transmitter and receiver longitude and latitude, frequency, and time. Reliability is defined 718 (e.g., 90%), and a distance loss profile is applied 720 for a given propagation tool such as VOACAP. The path loss may then be extracted 722.

In at least one embodiment, nodes in an HF mesh network may compute 702 a received signal strength. The node extracts 724 EIRP, path loss, path loss margin, frequency, receiver antenna gain, and receiver mismatch loss. Received signal strength is then determine as EIRP minus path loss and path loss margin, plus receiver antenna gain minus receiver mismatch loss.

Embodiments of the present disclosure are useful during solar flares including bursts of X-ray and ultra violet radiation. Such emissions ionize the ionosphere which affects HF propagation in the range of few dB to total blackout on one or more frequencies in the frequency table. The impact is regional, variable in intensity based on location, and frequency dependent; lower frequencies are affected more than higher frequencies. Solar flare updates may be received via an internet connection or via other HF nodes in the network.

Active route management techniques like ALE or waveform-initiated channel sounding may automatically incorporate the impact of solar flares as frequencies that are excessively penalized will not propagate hence are not used. If passive VOACAP predictions are used to determine connectivity between HF nodes, then frequency dependent loss due to solar flares should be accounted for. If an HF node is configured to receive solar flare notification, then the link budget may consider the frequency dependent solar flare loss. If a node is configured to account for solar flare impact, computing 702 received signal strength includes the frequency dependent loss in the link budget.

In at least one embodiment, nodes in an HF mesh network may compute 704 receive sensitivity. The node extracts 728 frequency, bandwidth, and signal-to-noise ratio. If the node determines 730 that the frequency is less than or equal to some threshold (e.g., 10 MHz), receiver noise is set 732 to some environmental noise based on the frequency; if the node determines 730 that the frequency is greater than the threshold, receiver noise is set 734 to some noise value. The node then calculates 736 receive sensitivity based on the sum of a predetermine threshold, a weighted log of bandwidth, the receiver noise, the signal-to-noise ratio, and some margin.

Embodiments of the present disclosure are useful during solar flares including bursts of X-ray and ultra violet radiation. Such emissions ionize the ionosphere which affects HF propagation in the range of few dB to total blackout on one or more frequencies in the frequency table. The impact is regional, variable in intensity based on location, and frequency dependent; lower frequencies are affected more than higher frequencies. Solar flare updates may be received via an internet connection or via other HF nodes in the network.

Active route management techniques like ALE or waveform-initiated channel sounding may automatically incorporate the impact of solar flares as frequencies that are excessively penalized will not propagate hence are not used. If passive VOACAP predictions are used to determine connectivity between HF nodes, then frequency dependent loss due to solar flares should be accounted for. If an HF node is configured to receive solar flare notification, then the link budget may consider the frequency dependent solar flare loss. If a node is configured to account for solar flare impact, computing received signal strength includes the frequency dependent loss in the link budget.

Embodiments of the present disclosure enable ad-hoc HF mesh network connectivity by allowing the spectral sensor/HF Receiver to see the entire HF spectrum (2.0 MHz-30.0 MHz). Ad-hoc HF mesh network connectivity forces all HF nodes on constrained platforms to bypass the HF coupler during receive. Bypassing the coupler mates the frequency dependent variable impedance antenna to a 50 Ohm receiver. Embodiments incorporate HF coupler efficiency, impedance mismatch loss, and direction dependent antenna gain when determining transmit power actually going out.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus embodied in a high frequency (HF) node in a mesh network comprising: at least one antenna; an HF coupler; and at least one processor in data communication with the at least one antenna and a memory storing processor executable code for configuring the at least one processor to: iteratively establish contact with other nodes in the mesh network; for each of the other nodes, iteratively establish contact via one of a set of available frequencies; measure an impedance mismatch loss for each other node at each available frequency; and produce a routing table including each frequency and corresponding mismatch loss.

2. The computer apparatus of claim 1, wherein the routing table comprises separate entries for transmit and receive.

3. The computer apparatus of claim 1, wherein each entire in the routing table comprises a frequency, a link margin, and a connectivity direction.

4. The computer apparatus of claim 1, wherein the routing table comprises both direct and indirect routing.

5. The computer apparatus of claim 1, wherein:
the at least one processor is further configured to measure HF coupler efficiency; and
the routing table is organized according to a link quality defined by the HF coupler efficiency and impedance mismatch loss.

6. The computer apparatus of claim 1, wherein:
the HF coupler is configured to bypass an impedance mismatch element; and
the at least one processor is further configured to bypass the impedance mismatch element while in a receive mode.

7. The computer apparatus of claim 6, wherein:
the at least one processor is further configured to:
bypass the impedance mismatch element in a receive mode when receiving in a first bandwidth; and
include the impedance mismatch element in a receive mode when receiving in a second bandwidth; and
the first bandwidth is larger than the second bandwidth.

8. A method of establishing a high frequency (HF) mesh network comprising:
iteratively establishing contact with other nodes in the mesh network;
for each of the other nodes, iteratively establishing contact via one of a set of available frequencies;
measuring an impedance mismatch loss for each other node at each available frequency; and
producing a routing table including each frequency and corresponding mismatch loss.

9. The method of claim 8, wherein the routing table comprises separate entries for transmit and receive.

10. The method of claim 8, wherein each entire in the routing table comprises a frequency, a link margin, and a connectivity direction.

11. The method of claim 8, wherein the routing table comprises both direct and indirect routing.

12. The method of claim 8, further comprising measuring an HF coupler efficiency, wherein the routing table is organized according to a link quality defined by the HF coupler efficiency and impedance mismatch loss.

13. The method of claim 8, further comprising:
bypassing an impedance mismatch element in a receive mode when receiving in a first bandwidth; and
including the impedance mismatch element in a receive mode when receiving in a second bandwidth,
wherein the first bandwidth is larger than the second bandwidth.

14. A high frequency (HF) mesh network system comprising: a plurality of HF nodes, each comprising: at least one antenna; an HF coupler; and at least one processor in data communication with the at least one antenna and a memory storing processor executable code for configuring the at least one processor to: iteratively establish contact with other nodes in the mesh network; for each of the other nodes, iteratively establish contact via one of a set of available frequencies; measure an impedance mismatch loss for each other node at each available frequency; and produce a routing table including each frequency and corresponding mismatch loss.

15. The system of claim 14, wherein the routing table comprises separate entries for transmit and receive.

16. The system of claim 14, wherein each entire in the routing table comprises a frequency, a link margin, and a connectivity direction.

17. The system of claim 14, wherein the routing table comprises both direct and indirect routing.

18. The system of claim 14, wherein:
the at least one processor is further configured to measure HF coupler efficiency; and
the routing table is organized according to a link quality defined by the HF coupler efficiency and impedance mismatch loss.

19. The system of claim 14, wherein:
the HF coupler is configured to bypass an impedance mismatch element; and
the at least one processor is further configured to bypass the impedance mismatch element while in a receive mode.

20. The system of claim 19, wherein:
the at least one processor is further configured to:
bypass the impedance mismatch element in a receive mode when receiving in a first bandwidth; and
include the impedance mismatch element in a receive mode when receiving in a second bandwidth; and
the first bandwidth is larger than the second bandwidth.

\* \* \* \* \*